United States Patent [19]

Haze

[11] Patent Number: 4,666,002
[45] Date of Patent: May 19, 1987

[54] SYSTEM FOR COMPULSORY PARTICIPATION OF WEIGHING MACHINES IN COMBINATORIAL WEIGHING

[75] Inventor: Setsuo Haze, Shiga, Japan

[73] Assignee: Kabushiki Kaisha Ishida Koki Seisakusho, Kyoto, Japan

[21] Appl. No.: 605,581

[22] Filed: Apr. 27, 1984

[30] Foreign Application Priority Data

Apr. 28, 1983 [JP] Japan .................................. 58-75446

[51] Int. Cl.$^4$ ...................... G01G 19/22; G01G 19/52
[52] U.S. Cl. .......................................... 177/1; 177/25; 177/50
[58] Field of Search .............................. 177/1, 25, 50

[56] References Cited

U.S. PATENT DOCUMENTS

| | | | |
|---|---|---|---|
| 4,313,507 | 2/1982 | Hays | 177/1 |
| 4,396,078 | 8/1983 | Minamida et al. | 177/1 |
| 4,418,771 | 12/1983 | Henry et al. | 177/1 |
| 4,466,500 | 8/1984 | Mosher et al. | 177/1 |
| 4,529,049 | 7/1985 | Fukuda | 177/25 X |

FOREIGN PATENT DOCUMENTS 59-84117  5/1984  Japan .

*Primary Examiner*—George H. Miller, Jr.
*Attorney, Agent, or Firm*—Staas & Halsey

[57] ABSTRACT

A system for compelling weighing machines to participate in a combinatorial weighing operation operates by updating the number of times a weighing machine is not selected for a combination, whenever a single combination giving a total weight value within preset allowable limits is obtained by combinatorial computation. The number for a weighing machine which is selected for a combination, is reset whenever a single combination giving a total weight value within preset allowable limits is obtained by combinatorial computation. A weighing machine, which has not discharged its articles for a large number of cycles, is compelled to participate in a combinatorial computation.

5 Claims, 6 Drawing Figures

SYSTEM FOR COMPULSORY PARTICIPATION OF WEIGHING MACHINES IN COMBINATORIAL WEIGHING

CROSS-REFERENCE TO RELATED APPLICATIONS

This application is related to U.S. application Ser. No. 428,291 filed Sept. 29, 1982 and U.S. application Ser. No. 459,940 filed Jan. 21, 1983, which are assigned to the Assignee of the subject application.

BACKGROUND OF THE INVENTION

This invention relates to a weighing system wherein weight values from respective ones of a plurality of weighing machines containing articles to be weighed are combinatorially processed to obtain a combination of weighing machines giving a combination of articles having a total weight value within preset allowable limits, followed by discharging the articles from the combination of weighing machines obtained. More particularly, the invention relates to a weighing system of the type described wherein a predetermined weighing machine is compelled to participate in the combinatorial processing.

A combinatorial weighing system which is known in the art includes a plurality of weighing machines and a control apparatus for performing combinatorial computations based on weight values from respective ones of the weighing machines, each of which contains a supply of articles to be weighed. The control apparatus computes combinations of the weight values produced by the weighing machines, obtains a combination (referred to as the "optimum combination") the total weight of which is equal to a target weight value or closest to the target weight value within preset allowable limits, discharges the articles from the machines belonging to the combination obtained, subsequently replenishes the weighing machines which have discharged their articles, with articles in order to prepare for the next weighing cycle, and subsequently repeats the foregoing steps to perform weighing automatically.

In the combinatorial weighing system of the above-described type, there are instances where certain weighing machines are not selected, and hence are not permitted to discharge their articles, even over an extended period of time. For example, if we assume that half of the total number of weighing machines are selected each time, then the probability of a weighing machine being selected each time should be 50% (one out of two). Accordingly, the probability of a weighing machine not being chosen in, say, five consecutive selection cycles is 3.125% (one out of 32), so that we would expect a given weighing machine to be chosen within the five consecutive cycles. In actuality, however, we find that, depending upon the weight of the articles delivered to the weighing machines, a given weighing machine or machines may not be selected over a great many cycles. When a weighing machine is not selected for a prolonged period of time, certain problems arise as will now be described.

(1) One problem involves the combinatorial weighing of frozen foods or foods that tend to spoil easily. Prolonged residence in a weighing machine due to non-selection of the weighing machine over an extended period of time will allow the surface ice on such articles to thaw or result in spoilage. The end result in either case is a product of diminished quality.

(2) A combinatorial weighing system is arranged in such a manner that articles are supplied from a dispersing table to each of a plurality of radial troughs corresponding to the weighing machines, the articles are fed from the troughs to corresponding pool hoppers and then from the pool hoppers to corresponding weighing hoppers for respective ones of the weighing machines. When articles are discharged from a weighing machine selected by combinatorial processing, the weighing machine is resupplied with articles from the corresponding pool hopper, after which the pool hopper is in turned supplied with articles from the corresponding radial trough. If a weighing machine fails to be selected over an extended period of time, therefore, the corresponding pool hopper will not be supplied by its radial trough, but the trough will be supplied with articles from the dispersing table each time a combinatorial processing cycle is executed. Eventually, the radial trough will overflow.

(3) Certain kinds of articles tend to become attached to a weighing machine when the articles reside in the weighing machine for a prolonged period. This results in a weighing error.

SUMMARY OF THE INVENTION

An object of the present invention is to provide a system wherein weighing machines are compelled to participate in combinatorial weighing performed by a combinatorial weighing or counting apparatus to prevent a situation in which weighing machines are not selected for an extended period of time.

Another object of the present invention is to provide a system wherein a weighing machine that has not discharged its articles is made to participate in combinatorial processing to prevent a situation in which the weighing machine fails to be selected for an extended period of time.

A further object of the present invention is to provide a system wherein weighing machines are compelled to participate in combinatorial weighing to minimize adhesion of articles to the weighing machines and to prevent deterioration of the articles.

According to the present invention, the foregoing objects are attained by providing a system for compulsory participation of weighing machines in combinatorial weighing, having a control apparatus which includes a processor for performing combinatorial computations based on weight values produced as outputs by respective ones of a plurality of weighing machines for weighing or counting articles supplied thereto, and a data memory having a storage area corresponding to each weighing machine, wherein the control apparatus performs the combinatorial computations to compute combinations of the weight values produced by the weighing machines, selects a single combination the total weight of which falls within preset allowable limits, discharges the articles from the machines belonging to the combination obtained, and compels a predetermined weighing machine to participate in the combinatorial computations. According to the present invention, the control apparatus is adapted to perform the following operations: (a) update a number of non-discharge cycles stored in storage areas of the data memory whenever a single combination within the preset allowable limits is selected by a combinatorial computation, the storage areas corresponding to weighing machines not selected for the combination, (b) reset a number of non-discharge cycles stored in storage areas of the data memory whenever a single combination within the preset allowable limits is selected by a combinatorial computation, the storage areas corresponding to weighing machines selected for the combination, and (c) compel a weighing machine, which corresponds to a storage area of the data memory storing a large number of non-discharge cycles, to participate in a combinatorial computation.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Reference will now be had to the drawings to describe an embodiment of the present invention in detail.

Figure 1:
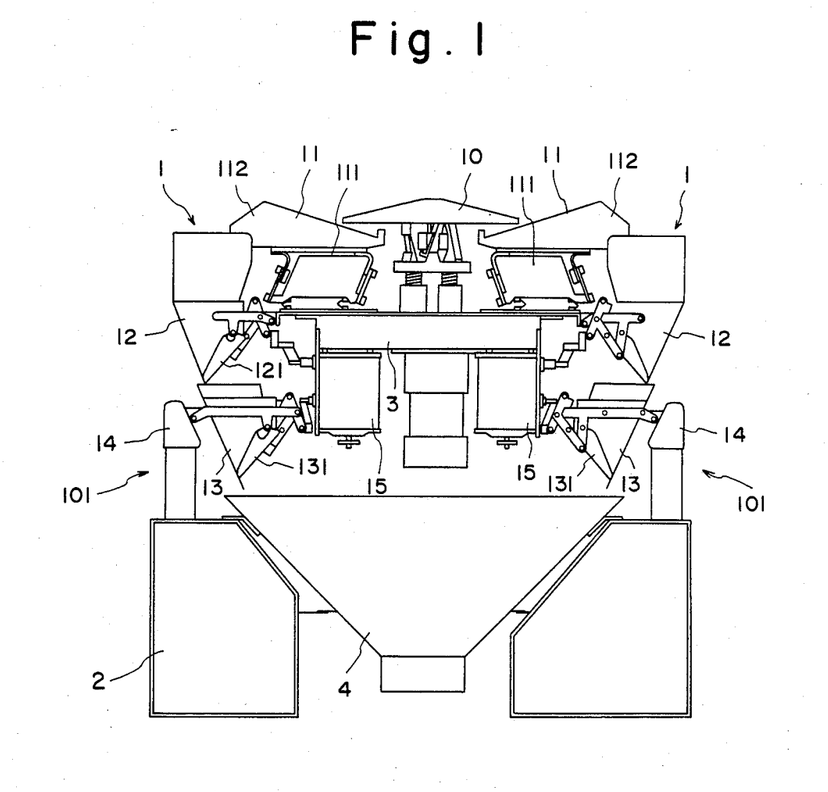
FIG. 1 is a simplified side view of an embodiment of a combinatorial weighing apparatus for practicing the present invention.

Illustrated in FIG. 1 is an example of a combinatorial weighing apparatus for practicing the present invention. Numeral 10 denotes a dispersing table of vibratory conveyance-type supported by a platform 3 disposed above the central portion of a base 2. Articles to be weighed are introduced onto the dispersing table 10 from chutes of a supply conveyor (not shown), and are imparted with vibratory motion for a predetermined length of time so as to be dispersed radially outward from the center of the table. Numerals 1, ... 1 denote n-number of weighing stations which are arranged around the dispersing table 10 along radially extending lines to receive the articles dispersed by the table 10. Each weighing station 1 includes a dispersing feeder 11, a pool hopper 12, a weighing machine 101 comprising a weighing hopper 13 and a weight sensor 14, and a hopper drive unit 15 for opening and closing a hopper gate 121 of the pool hopper 12 and a hopper gate 131 of the weighing hopper 13.

The dispersing feeders 11 are arranged radially so as to surround the dispersing table 10, and each includes an electromagnetic vibrator 111 and a trough 112 supported by the platform 3. Articles supplied to the trough 112 from the dispersing table 10 fall into the corresponding pool hopper 12 from the end of the trough due to the linear reciprocating motion of the electromagnet 111. The pool hopper gate 121 is opened under the control of the hopper drive unit 15, whereupon the articles contained in the pool hopper 12 are released into the corresponding weighing hopper 13 constituting the weighing machine 101. Each of the weight sensors 14 attached to a respective one of the weighing hoppers 13, is operable to measure the weight of the articles introduced into the corresponding weighing hopper 13, and to apply an electrical signal indicative of the measured weight to a combinatorial control apparatus, described below. The combinatorial control apparatus then obtains an optimum combination by performing processing for combinatorial weighing based on the weight values obtained from the weighing machines 101, and produces a discharge control command which is applied to the hopper drive units 15 corresponding to the optimum combination. The hopper drive units 15 respond to the command by opening the hopper gates 131 on the weighing hoppers 12 of the corresponding weighing machines 101, whereby the articles contained in these weighing machines 13 are discharged.

Designated at numeral 4 is a collecting chute disposed below the weighing hoppers 13 for collecting the articles released from the weighing machines 101 and for supplying these articles to a packaging machine (not shown).

Figure 2:
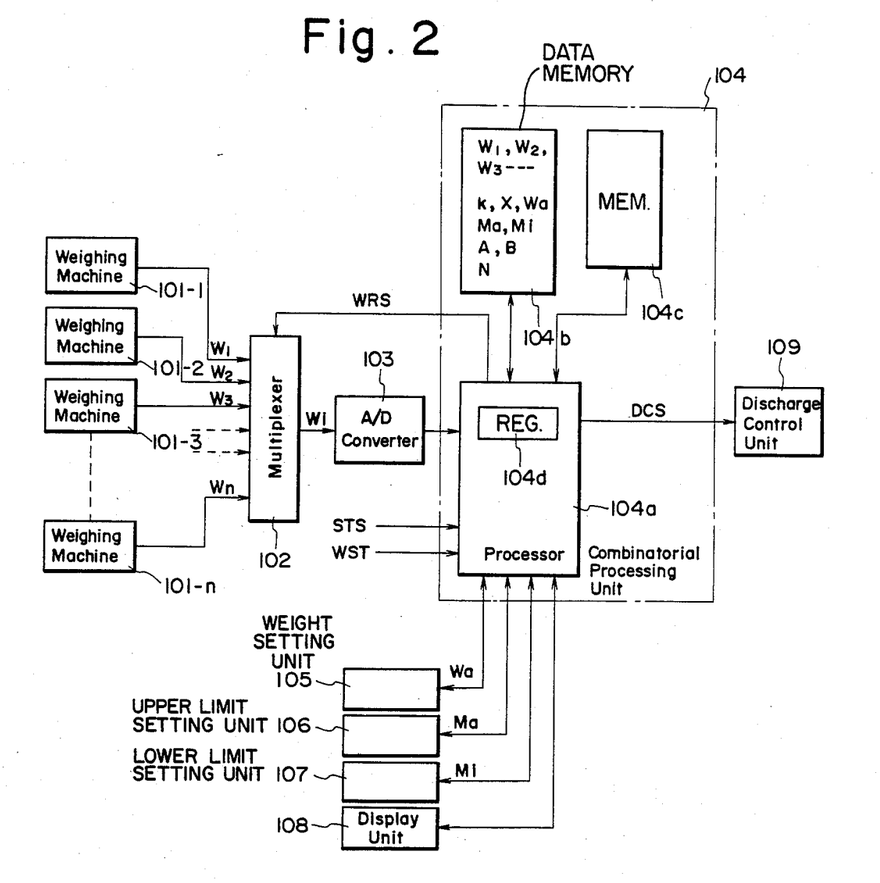
FIG. 2 is a block diagram of a control apparatus for practicing the system for compulsory participation of weighing machines in combinatorial weighing according to the present invention.

A block diagram of a combinatorial control apparatus for practicing the present invention is illustrated in FIG. 2.

In FIG. 2, weight values Wi (i=1, 2, ... n) produced by n-number of the aforementioned weighing machines 101-1, 101-2 ... 101-n are applied to a multiplexer 102, constituted by, e.g., an analog switch, which delivers the weight values in sequential fashion in response to a weight read signal WRS from a combinatorial processing unit 104. An analog-to-digital (A/D) converter 103 converts each analog weight value Wi, delivered by the multiplexer 102, into a digital value. The digital output of the A/D converter 103 is applied to the combinatorial processing unit 104, which has the construction of a microcomputer. The latter includes a processor 104a which receives the output of the A/D converter 103 for executing processing in accordance with a combinatorial processing program, a data memory 104b comprising a RAM (random-access memory), and a memory 104c for storing the combinatorial processing program. A weight setting unit 105 sets a target weight value $W_a$, which is applied to the processor 104a. Numeral 106 denotes an upper limit setting unit, and 107 a lower limit setting unit. The units 106, 107 are for establishing preset allowable limits (an upper limit value $M_a$ and a lower limit value $M_l$) for the total weight value of a combination. Customarily, the limit value $M_l$ is set to be equal to the target weight value $W_a$. Setting Mi to a value less than Ma is undesirable as it can result in a total discharged weight that is too small. Numeral 108 denotes a display unit for displaying the total weight of a combination, the weighing machines selected, improper weights, etc. Numeral 109 denotes a discharge control unit.

Figure 3:
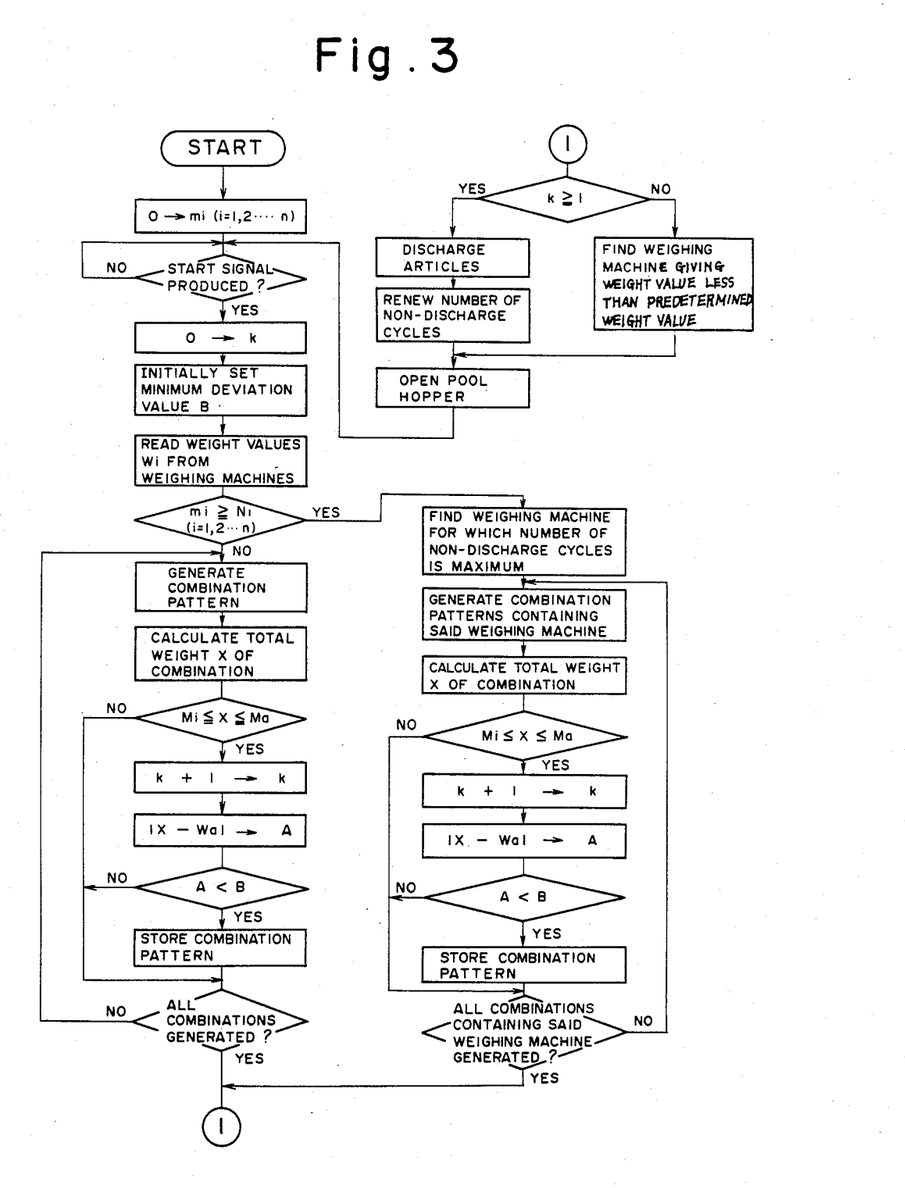
FIG. 3 is a flowchart for the processing in accordance with a first embodiment of the present invention.

The weighing operation performed by the combinatorial weighing apparatus of FIG. 2 will now be described in conjunction with the flowchart of FIG. 3 which illustrates a first embodiment of the invention.

(a) When a work start signal WST is generated by pressing a start button on a control panel (not shown), the processor 104a clears to zero the contents of areas in the data memory 104b storing the number of times non-discharge takes place. Specifically, the data memory 104b has a storage area for each weighing machine. Each area is for storing the number of times $m_i$ (i=1, 2, ... n) the corresponding weighing machine is not selected for discharge. In response to generation of the work start signal WST, the processor 104a performs an initial setting operation, namely:

$$0 \to m_i \ (i=1, 2, \ldots n)$$

(b) When a packaging machine (not shown) generates a start signal (timing signal) STS, the signal is read by the processor 104a. Upon detecting the generation of the start signal STS, the processor 104a sets to zero a numerical value k stored in the data memory 104b, and initially sets a minimum deviation value B to a predetermined number. In addition, the processor 104a delivers the weight value read signal WRS to the multiplexer 102. The latter responds by successively applying the weight values Wi (i=1, 2 . . . n) to the AD converter 103, which proceeds to convert each weight value Wi into a digital quantity that the processor 104a stores in the data memory 104b.

(c) The processor 104a then determines, with regard to each weighing machine, whether the number of times $m_i$ (i=1, 2, . . . n) the weighing machine has not been selected is equal to or greater than a threshold value $N_1$ (e.g., 11 times) preset therefor.

(d) If $m_i < N_1$ is found to hold for all $m_i$, the processor 104a sequentially generates $2^n - 1$ combination patterns under the control of the combinatorial processing program. The $2^n - 1$ combination patterns are generated in the following manner. Specifically, the processor 104a has an internal general-purpose register 104d. Correspondence is established between the first bit of the register 104a and the first weighing machine (weight value W1), the second bit and the second weighing machine (W2), and so on through the n-th bit, which corresponds to the n-th weighing machine (weight value Wn). Then, when the general-purpose register 104d has been counted up from 1 to $2^n - 1$, the result will be the generation of $2^n - 1$ combination patterns 0000 . . . 001 through 1111 . . . 111.

(e) The processor 104a is adapted to add the weight values corresponding to the "1" bits in each of the combination patterns to calculate the total weight value X ($=\Sigma Wi$) of each and every combination. Accordingly, in response to generation of the first combination pattern 0000 . . . 001, the processor 104a calculates X ($=W1$) and stores this value in the data memory 104b.

(f) The processor 104a determines whether the total weight X of the combination falls within certain limits, that is, whether the following relation holds:

$$M_i \leq X \leq M_a \quad (1)$$

If Eq. (1) is satisfied, then k is updated through the following operation:

$$k+1 \to k \quad (2)$$

and the absolute value of the difference between the total weight X of the combination and the target weight value Wa is calculated. In other words, a difference A is calculated by performing the following operation:

$$|X - W_a| \to A \quad (3)$$

(g) The processor 104a then compares the magnitude of the difference $|A|$ and of a minimum deviation value B, which is stored in the data memory 104b. If $|A| < B$ is found to hold, the difference $|A|$ is made equal to the minimum deviation value B, i.e., the operation $|A| \to B$ is performed, and the bit pattern 000 . . . 001 is stored in the data memory 104b as a combination pattern which, up to the present point in time, is the optimum combination. In a case where the lower limit value is set equal to the target weight value, the processor 104a initially sets the difference between the upper limit value $M_a$ and the target weight value $W_a$ in the data memory 104b as the minimum deviation value B.

(h) Thereafter, or where X does not satisfy Eq. (1), or where $|A| \geq B$ holds, the processor 104a determines whether all possible combination patterns have been generated. Where this is not the case, the general-purpose register 104d is incremented and the second combination pattern 000 . . . 010 is generated. From this point onward, the foregoing processing is repeated until all combination patterns are generated.

(i) The processor 104a then determines whether the following holds:

$$k \geq 1 \quad (4)$$

If it does not, then the processor regards this as signifying failure to obtain a combination the total weight value of which is within the preset allowable limits. Accordingly, and by way of example, the processor finds a weighing machine whose weight value is less that a predetermined value, opens the pool hopper corresponding to this weighing machine to provide the weighing machine with additional articles, and then awaits generation of the start signal.

(j) If Eq. (4) is satisfied, on the other hand, the processor 104a supplies the discharge control unit 109 with the optimum combination pattern stored in the data memory 104b, whereby the weighing hoppers associated with the weighing machines corresponding to the "1" bits in the optimum combination pattern are opened to discharge the articles contained therein.

(k) Thereafter, the processor 104a resets to, e.g., zero, the number $m_i$ (stored in the data memory 104b) of non-discharge cycles for any weighing machine that has discharged its articles as a result of the previous step. For any weighing machine that has not discharged its articles during the previous step, the processor updates $m_i$ by performing the following operation:

$$mi + 1 \to m_i \quad (5)$$

(1) Next, the processor 104a produces an enable signal to open the pool hopper corresponding to the weighing machine (or machines) that has discharged its articles, whereby the articles contained in the pool hopper are supplied to the weighing machine. The processor then awaits the generation of the start signal.

(m) If the decision rendered in step (c) is that the number of non-discharge cycles for at least one weighing machine is equal to or greater than the set threshold value $N_1$, the processor 104a finds the machine (assumed to be one in number in the present example) for which the number of non-discharge cycles is maximum, compels this weighing machine to participate in combinatorial processing, and obtains, solely from among those combinations that include the weighing machine compelled to participate in processing, a combination, the total weight value of which is equal to the target weight value or closest to the target weight value within the preset allowable limits. The processor 104a then executes processing from step (i) onward.

Figure 4:
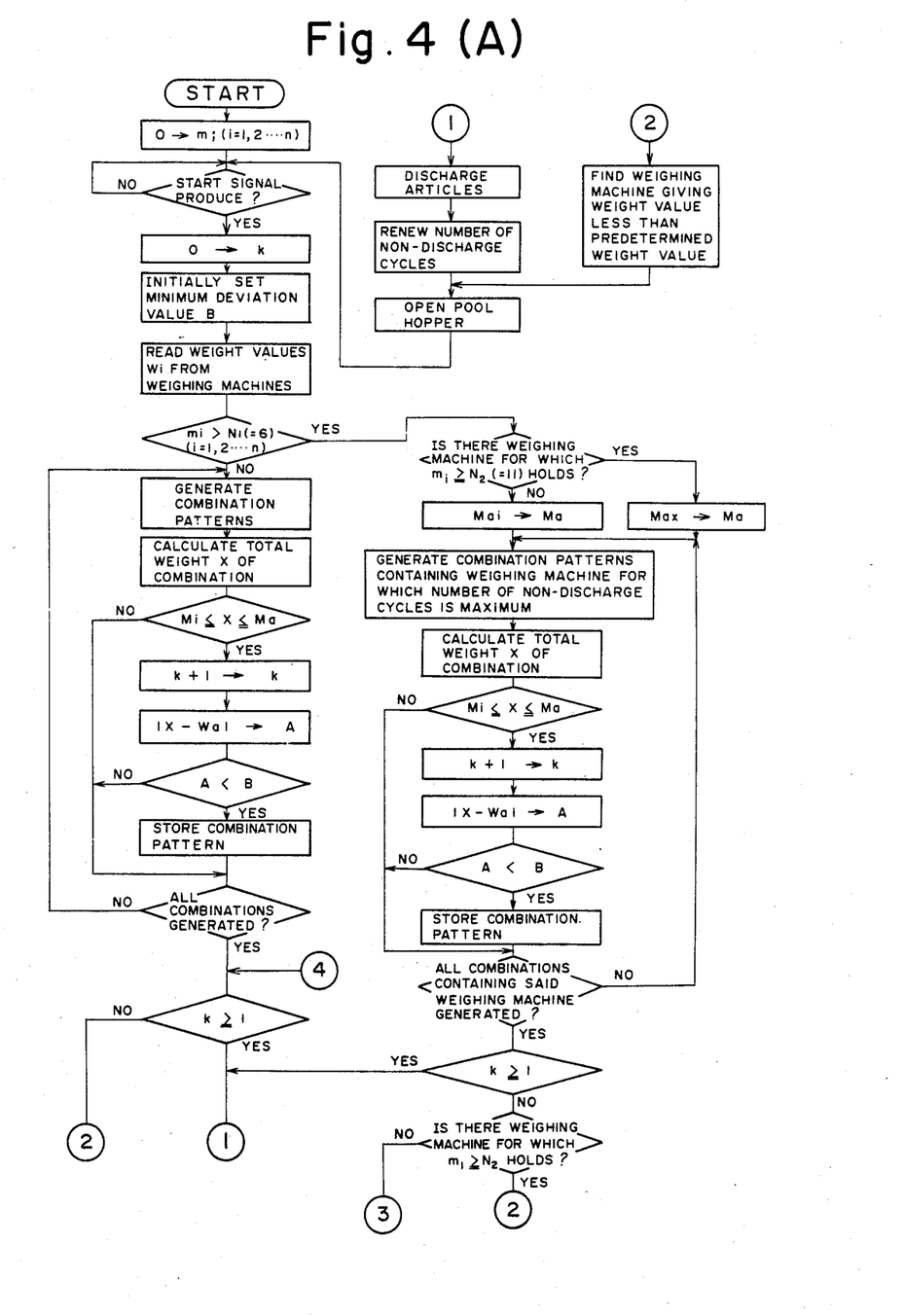
FIGS. 4(A) and 4(B) are flowcharts illustrating a second embodiment of the present invention.

FIG. 4 (including FIGS. 4(A) and 4(B) is a flowchart illustrating a second embodiment of the present invention. This embodiment differs from that of FIG. 3 in that (1) $N_1$ and $N_2$ are set as threshold values of the number of non-discharge cycles; (2) subsequent processing depends upon one of three cases, namely a first case in which the number $m_i$ (i=1, 2 ... n) of non-discharge cycles for all weighing machines is less than the first set threshold value $N_1$, a second case in which the number $m_i$ (i=1, 2 ... n) of non-discharge cycles for all weighing machines is less than the second set threshold value $N_2$ and the number of non-discharge cycles for at least one weighing machine is equal to or greater than the first set threshold value $N_1$, and a third case in which the number of non-discharge cycles for at least one weighing machine is equal to or greater than the second set threshold value $N_2$; and (3) predetermined combinatorial processing is executed for each case.

Processing for each of the foregoing cases will now be described in detail.

In the first case, in which the number of non-discharge cycles for all weighing machines is less than the first set threshold value $N_1$ (e.g., $N_1$=6), the processor 104a executes processing identical with steps (d) through (h) of the first embodiment to obtain, from all combinations of the weighing machines, a combination giving a total weight value equal to the target weight value $W_a$ or closest to the target weight value $W_a$ within the preset allowable limits, namely between the upper and lower limit values $M_a$ and $M_i$ provided by the upper and lower limit setting units 106. 107. The articles are discharged from the combination of weighing machines obtained in step (1). If an optimum combination is not obtained by the process steps (d) through (h), additional articles are introduced by executing step (i).

Following a discharge of articles, the processor 104a executes processing identical with step (k) of the first embodiment to update the number of non-discharge cycles, supply weighing machines from the combination with articles from the corresponding pool hoppers, and await a start signal.

In the second case, in which the number of nondischarge cycles for all weighing machines is less than the second set threshold value $N_2$ (e.g., 11) and the number of non-discharge cycles for at least one weighing machine is equal to or greater than the first set threshold value $N_1$ (=6), the processor 104a narrows the preset allowable limits to $M_i$, $M_{ai}$ (where $M_{ai}$ is less than the upper limit value $M_a$ and the range covered by the allowable limits is 0.8 g), finds the machine for which the number of non-discharge cycles is maximum, compels this weighing machine to participate in combinatorial processing and obtains, solely from among those combinations that include the weighing machine compelled to participate in processing, a combination the total weight value of which is equal to the target weight value $W_a$ or closest to the target weight value $W_a$ within the narrowed allowable limits $(M_i, M_{ai})$. If an obtimum combination is obtained, the processor 104a executes the step (j) of the first embodiment to discharge the articles from the combination of weighing machines obtained and subsequently executes steps similar to (k), (l) of the first embodiment to update the number of non-discharge cycles, supply weighing machines from the combination with articles from the corresponding pool hoppers, and await a start signal.

If an optimum combination is not obtained, on the other hand, the processor 104a restores the allowable limits to $M_i$, $M_a$. Then, from among combinations of weighing machines other than those combinations containing the weighing machine exhibiting the maximum number of non-discharge cycles, the processor 104a obtains a combination equal to the target weight value $W_a$ or closest to the target weight value $W_a$ within the preset allowable limits, and causes the obtained combination of weighing machines to discharge their articles.

In the third case, in which the number of nondischarge cycles for at least one weighing machine is equal to or greater than the second set threshold value $N_2$, the processor 104a widens the preset allowable limits to $M_i$, $M_{ax}$ (where $M_{ax}$ is greater than the upper limit value $M_a$ and the range covered by the allowable limits is, e.g., 10 g), finds the machine for which the number of non-discharge cycles is maximum, compels this weighing machine to participate in combinatorial processing and obtains, solely from among those combinations that include the weighing machine compelled to participate in processing, a combination the total weight value of which is equal to the target weight value $W_a$ or closest to the target weight value $W_a$ within the widened allowable limits $(M_i, M_{ax})$. The processor 104a executes the step (j) of the first embodiment to discharge the articles from the combination of weighing machines obtained and subsequently executes steps similar to (k), (l) of the first embodiment to update the number of non-discharge cycles, supply weighing machines from the combination with articles from the corresponding pool hopper, and await a start signal.

Though $M_{ax}$ is set to be comparatively large to assure that a combination within the allowable limits will be obtained, there are instances where no combination exists within the allowable limits $(M_i, M_{ax})$. In such cases additional articles are supplied by executing a step similar to step (i) of the first embodiment.

Figure 5:
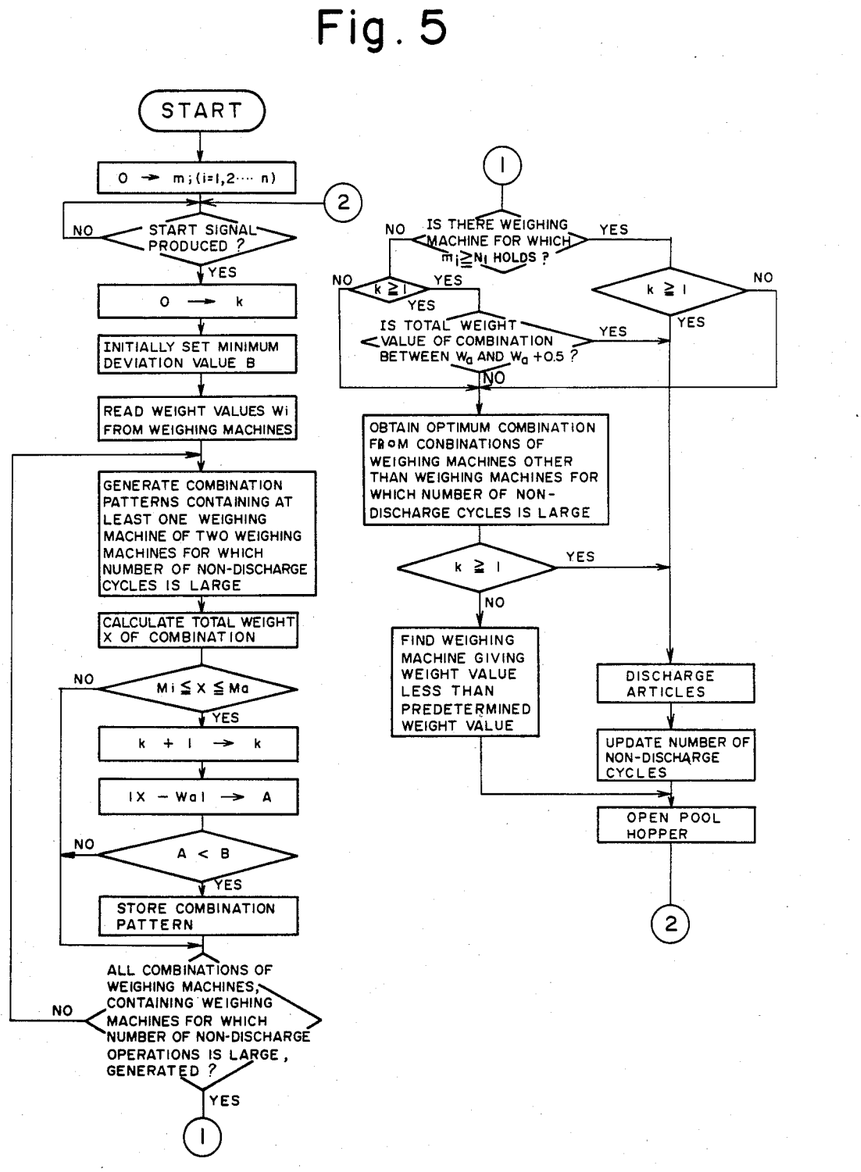
FIG. 5 is a flowchart for the processing in accordance with a third embodiment of the present invention.

FIG. 5 is a flowchart illustrating a third embodiment of the present invention.

When a work start signal WST is generated by pressing a start button on a control panel (not shown), the processor 104a clears to zero the number $m_i$ (i=1, 2 ... n) of discharge cycles for each of the weighing machines.

(b) When a start signal STS is generated by a packaging machine, (not shown), the processor 104a executes processing similar to that of step (b) in the first embodiment. Specifically, the processor 104a sets the numerical value k, which is stored in the data memory 104b, to zero, and reads the weight values Wi (i=1, 2 ... n) from the respective weighing machines.

(c) The processor 104a then finds two weighing machines (though the number is not necessarily limited to two) exhibiting a large number of non-discharge cycles and, from among those combinations containing at least one of these two weighing machines, obtains a combination giving a total weight value equal to the target weight value $W_a$ or closest to the target weight value $W_a$ within preset allowable limits $(M_i, M_a)$.

(d) Next, the processor 104a determines whether there is a weighing machine for which the number $m_i$ of non-discharge cycles is equal to or greater than a preset threshold value $N_1$ (e.g., 10).

(e) If there is no weighing machine for which the number $m_i$ of non-discharge cycles is equal to or greater than a preset threshold value $N_1$ (=10), the processor 104a determines whether k≧1 holds. If the relation k≧1 does hold, the processor 104a determines whether the total weight value of the combination obtained in step (c) lies in a range defined by the target weight value $W_a$ and $W_a$+W (where W is equal to, e.g., 0.5 g). If the total weight of the combination does lie between $W_a$ and $W_a+0.5$, then the processor 104a delivers the combination pattern to the discharge control unit 109, which responds by causing the weighing hoppers of the weighing machines corresponding to the "1" bits in the combination pattern to discharge their articles.

(f) Thereafter, the processor 104a clears to zero the number $m_i$ corresponding to the weighing machines that have discharged their articles and increments the number $m_i$ corresponding to the weighing machines that have not discharged their articles.

(g) The processor 104a then opens the pool hoppers corresponding to weighing machines that have discharged their articles, whereby the articles contained in these pool hoppers are supplied to the weighing machines. The processor then awaits a start signal.

(h) If the result of the decision rendered in step (e) is that $k=0$ or that the total weight of the combination does not fall within the limits $W_a$, $W_a+0.5$, then the processor 104a obtains, from among combinations of weighing machines other than those combinations containing the weighing machine (or the two weighing machines) exhibiting the largest number of non-discharge cycles, a combination equal to the target weight value $W_a$ or closest to the target weight value $W_a$ within the allowable limits ($M_i$, $M_a$).

(i) If a combination is obtained in step (h), the processor 104a delivers the combination pattern to the discharge control unit 109, which responds by causing the weighing hoppers of the weighing machines corresponding to the "1" bits in the combination pattern to discharge their articles.

(j) If a combination is not obtained in step (h), the processor opens the pool hoppers corresponding to weighing machines producing weight values that are less than a predetermined value, whereby these weighing machines are supplied with additional articles. The processor then awaits a start signal.

(k) If a weighing machine for which the number of discharge cycles is equal to or greater than the set threshold value is found to exist in step (d), the processor 104a supplies the discharge control unit 109 with the combination pattern obtained in step (c), and the discharge control unit 109 responds by causing the weighing hoppers of the weighing machines corresponding to the "1" bits in the combination pattern to discharge their articles. The processor then executes steps (f) and (g).

(l) If a combination is not obtained in step (c) (i.e., if $k=0$), then the processor 104a executes steps (h), (i) and (j).

While the present invention is applied to a combinatorial weighing apparatus in each of the foregoing embodiments, the invention may also be applied to a combinatorial counting apparatus, in which the weight values from the respective weighing machines are converted into numbers indicative of the number of articles contained in each weighing machine, with the numbers obtained being subjected to combinatorial processing.

As many apparently widely different embodiments of the present invention can be made without departing from the spirit and scope thereof, it is to be understood that the invention is not limited to the specific embodiments thereof except as defined in the appended claims.

What we claimed is:

1. A method for compulsory participation of weighing machines in a combinatorial weighing system having a control apparatus which includes a processor for performing combinatorial computations based on weight values produced as outputs by respective ones of a plurality of weighing machines for weighing or counting articles supplied thereto, and a data memory having storage areas corresponding to respective weighing machines, the control apparatus performing the combinatorial computations to compute combinations of the weight values produced by the weighing machines, selecting a single combination the total weight of which falls within preset allowable limits, discharging the articles from the weighing machines belonging to the single combination selected, and compelling a predetermined weighing machine to participate in the combinatorial computations, said method being performed under the control of the control apparatus and comprising the steps of:

(a) updating, by a predetermined amount, data stored in the storage areas of the data memory whenever a single combination within the preset allowable limits is selected by a combinatorial computation, the updated storage areas corresponding to the weighing machines not selected as part of the selected single combination;

(b) resetting data stored in the storage areas of the data memory whenever a single combination within the preset allowable limits is selected by a combinatorial computation, the reset storage areas corresponding to the weighing machines which are selected as part of the selected single combination;

(c) determining whether the data in each of the storage areas of the data memory is indicative of a value less than a first set threshold value, equal to or greater than the first set threshold value and less than a second set threshold value, or equal to or greater than the second set threshold value;

(d) obtaining, when the data stored in all of the storage areas of the data memory are indicative of values less than the first set threshold value and from among all combinations of all weighing machines, a combination of weighing machines giving a total weight value equal to a target value or closest to the target value within the preset allowable limits;

(e) compelling, when the data stored in all of the storage areas of the data memory are indicative of values less than the second set threshold value and the data stored in at least one storage area is indicative of a value equal to or greater than the first set threshold value, the weighing machine corresponding to the at least one storage area to participate in the combinatorial computations;

(f) obtaining, solely from among combinations that contain the weighing machine compelled to participate in the combinatorial computations in said step (e), a combination of weighing machines giving a total weight value equal to the target value or closest to the target value within the preset allowable limits;

(g) compelling, when the data stored in at least one of the storage areas of the data memory is indicative of a value equal to or greater than the second set threshold value, the weighing machine corresponding to the at least one storage area to participate in the combinatorial computations, and raising an upper limit value of the preset allowable limits to obtain adjusted preset allowable limits;

(h) obtaining, solely from among combinations that contain the weighing machine compelled to participate in the combinatorial computations in said step (g), a combination of weighing machines giving a total weight value equal to the target value or closest to the target value within the adjusted preset allowable limits; and (i) discharging the articles from the combination of weighing machines obtained in said steps (d), (f), or (h).

2. A method for compulsory participation of weighing machines in a combinatorial weighing system having a control apparatus which includes a processor for performing combinatorial computations based on weight values produced as outputs by respective ones of a plurality of weighing machines for weighing or counting articles supplied thereto, and a data memory having storage areas corresponding to respective weighing machines, the control apparatus performing the combinatorial computations to compute combinations of the weight values produced by the weighing machines, selecting a single combination the total weight of which falls within preset allowable limits, discharging the articles from the weighing machines belonging to the single combination selected, and compelling a predetermined weighing machine to participate in the combinatorial computations, said method being performed under the control of the control apparatus and comprising the steps of:

(a) updating a number of non-discharge cycles stored in the storage areas of the data memory whenever a single combination within the preset allowable limits is selected by a combinatorial computation, the updated storage areas corresponding to the weighing machines not selected as part of the selected single combination;

(b) resetting a number of non-discharge cycles stored in the storage areas of the data memory whenever a single combination within the preset allowable limits is selected by a combinatorial computation, the reset storage areas corresponding to the weighing machines which are selected as part of the selected single combination;

(c) obtaining a combination of weighing machines giving a total weight value equal to a target value or closest to the target value within the preset allowable limits, the obtained combination being obtained from among combinations that contain at least one weighing machine from among a predetermined number of weighing machines corresponding to storage areas of the data memory storing a large number of non-discharge cycles, said step (c) including the substeps of:

(c1) determining whether there is a storage area storing a number of non-discharge cycles which is greater than a predetermined value; and (c2) diminishing an upper limit value of the preset allowable limits only when such a storage area is determined not to exist; and (d) discharging the articles from the combination of weighing machines obtained in said step (c).

3. The method according to claim 2, further comprising, when a total weight value of a combination within the preset allowable limits is not obtained in said step (c), the steps of:

obtaining, from among combinations that do not contain a weighing machine compelled to participate in combinatorial computations, a combination of weighing machines giving a total weight value equal to the target value or closest to the target value within the preset allowable limits; and discharging the articles from the combination of weighing machines obtained.

4. A combinatorial measuring method for combining weight values corresponding to weighed batches of articles, to select an optimum combination having a total combined value equal to or closest to a target value within preset allowable limits, comprising the steps of:

(a) storing, for each of the weighed batches of articles, status data indicating the number of optimum combinations which have been selected in which the corresponding weighed batch of articles did not participate;

(b) clearing the stored status data corresponding to a weighed batch of articles which is selected as a part of the optimum combination;

(c) updating, by a predetermined quantity, the stored status data corresponding to each weighed batch of articles which does not participate in the optimum combination, said clearing and updating steps being carried out each time an optimum combination is selected;

(d) determining, for each weighed batch of articles, whether the stored status data exceeds a first set threshold value;

(e) determining, for each weighed batch of articles, whether the stored status data exceeds a second set threshold value if at least one of the weighed batches of articles corresponds to stored status data which is determined to exceed the first set threshold value in said step (d);

(f) narrowing the range of the preset allowable limits if it is determined in said step (e) that none of the weighed batches of articles corresponds to stored status data which exceeds the second set threshold value;

(g) widening the range of the preset allowable limits if it is determined in said step (e) that at least one of the batches of articles exceeds the second set threshold value;

(h) selecting, in dependence upon said step (d), a combination, solely from among combinations including the one of the weighed batches of articles corresponding to stored status data which exceeds the first set threshold value by the greatest amount, having a total combined value which is closest to the target value within the preset allowable limits; and (i) discharging the weighed batches of articles participating in the combination selected in said step (h).

5. A method for compulsory participation of weighing machines in a combinatorial weighing system having a control apparatus which includes a processor for performing combinatorial computations based on weight values produced as outputs by respective ones of a plurality of weighing machines for weighing or counting articles supplied thereto, and a data memory having storage areas corresponding to respective weighing machines, the control apparatus performing the combinatorial computations to compute combinations of the weight values produced by the weighing machines, selecting a single combination the total weight of which falls within preset allowable limits, discharging the articles from the weighing machines belonging to the single combination selected, and compelling a predetermined weighing machine to participation in the combinatorial computations, said method being performed under the control of the control apparatus and comprising the steps of:

(a) updating a number of non-discharge cycles stored in the storage areas of the data memory whenever a single combination within the preset allowable limits is selected by a combinatorial computation, the updated storage areas corresponding to the weighing machines not selected as part of the selected single combination;

(b) resetting a number of non-discharge cycles stored in the storage areas of the data memory whenever a single combination within the preset allowable limits is selected by a combinatorial computation, the reset storage areas corresponding to the weighing machines which are selected as part of the selected single combination;

(c) obtaining a combination of weighing machines giving a total weight value equal to a target value or closest to the target value within the preset allowable limits, the obtained combination being obtained solely from among combinations that contain at least one weighing machine from among a predetermined number of weighing machines corresponding to storage areas of the data memory storing a large number of non-discharge cycles, said step (c) further including the substeps of:

(c1) determining whether there is a storage area storing a number of non-discharge cycles which is greater than a predetermined value;

(c2) determining whether a total weight value of an obtained combination exists which is within diminished preset allowable limits which are smaller than said preset allowable limits, when it is determined in said substep (cl) that there is no storage area of the data memory storing a number of non-discharge cycles which is greater than the predetermined value; and (c3) proceeding to step (d) when the total weight value of the obtained combination is not within the diminished preset allowable limits;

(d) obtaining, from among combinations that do not contain at least one weighing machine compelled to participate in a combinatorial computation, a combination of weighing machines giving a total weight value equal to the target value or closest to the target value within the preset allowable limits when a total weight value of a combination within the preset allowable limits is not obtained in said step (c); and (e) discharging the articles from the combination of weighing machines obtained in said step (c) or said step (d).

* * * * *

UNITED STATES PATENT AND TRADEMARK OFFICE
CERTIFICATE OF CORRECTION

PATENT NO. : 4,666,002
DATED      : MAY 19, 1987
INVENTOR(S) : SETSUO HAZE

It is certified that error appears in the above-identified patent and that said Letters Patent is hereby corrected as shown below:

Col. 3, line 27, "illustrating" should be --for the processing in accordance with--.

Col. 7, line 28, "106. 107." should be --106 and 107.--.

Col. 8, line 36, "When" should be --(a) When--.

Col. 12, line 67, "participation" should be --participate--.

Signed and Sealed this

Twenty-second Day of December, 1987

Attest:

DONALD J. QUIGG

Attesting Officer

Commissioner of Patents and Trademarks